INVENTOR.
Everett Douglas Cann
BY

Wolfe, Hubbard, Voit & Osann
ATTORNEYS

United States Patent Office 3,579,296
Patented May 18, 1971

3,579,296
DUAL CYCLE TREATMENT OF SULFUR DIOXIDE CONTAINING FLUE GAS AND THE LIKE
Everett Douglas Cann, Freeport, Ill., assignor of fractional part interest to William T. Neiman
Filed Nov. 13, 1967, Ser. No. 682,435
Int. Cl. C01b 17/60
U.S. Cl. 23—178                                       11 Claims

ABSTRACT OF THE DISCLOSURE

A method is provided for treating flue gas and the like for sulfur dioxide removal and recovery. The gas, containing a minor but polluting amount of sulfur dioxide and substantially no sulfur trioxide, is contacted with ammonia in the presence of water to form an ammonium sulfite. This is separated and, in the absence of oxygen, reacted with an aqueous alkaline earth metal oxide or with zinc oxide to liberate the ammonia for recycle and to form insoluble alkaline earth metal or zinc sulfite. The latter is dried, dehydrated, and thermally decomposed to liberate a concentrated stream of sulfur dioxide and to form alkaline earth metal oxide or zinc oxide for recycle. Procedures are disclosed for efficiently conducting the above processing steps and operations.

FIELD OF INVENTION

This invention relates to the treatment of flue gas, or other effluent gas containing sulfur dioxide, for purification of the gas and for recovery of the sulfur dioxide. The invention thus concerns both the avoidance of air pollution and the recovery of useful byproduct sulfur dioxide.

BACKGROUND OF THE INVENTION

Air pollution caused by combustion of sulfur-containing fossil fuels represent one of the most serious causes of atmospheric pollution. A typical medium sized hydrothermal stream plant of 500-megawatt capacity will burn some 5,000 tons of coal per day. If this coal contains as little as 3% sulfur, roughly 300 tons per day of sulfur dioxide gas is discharged through the stack. Upon hydration and atmospheric oxidation, this is converted to 450 tons per day of noxious sulfuric acid fumes.

A variety of methods have been proposed for removing sulfur dioxide from effluent gases, and while these methods are frequently acceptable in theory, in practice their success has been minimal. Primarily, such methods must treat very large volumes of flue gas—our 500-megawatt coal-fired plant produces 880,000 cubic feet per minute of flue gas at standard conditions—containing less than a few percent of sulfur dioxide. To cope with such large quantities and low concentrations has heretofore required complex and esoteric procedures, major capital investment, and substantial consumption of chemicals and utilities. It is accordingly a principal object of the invention to provide a method for treating sulfur dioxide containing effluent gases which is comparatively simple, which requires minimal additional investment in equipment, and which minimizes the consumption of chemicals and processng utilities.

Furthermore, many of the heretofore-proposed systems have been only of limited effectiveness. Quite apparently, where a major aim of treating the flue gas is to alleviate a pollution condition, removal of sulfur dioxide must be as complete as possible. A further object of the present invention is to provide a method of treating such gases which is highly effective, and which is potentially capable of removing up to 85% or 90%, or more, of the sulfur dioxide.

Moreover, and apart from capital investment and operating charges, it is desirable that a flue gas treatment plant be capable of producing the sulfur dioxide co-product as a concentrated useful stream from which production of elemental sulfur or sulfur trioxide (for sulfuric acid manufacture) may be practiced. A further object of the invention is to provide a method wherein the sulfur dioxide so recovered is produced as a concentrated stream capable of facile conversion to other valuable materials.

Yet another feature of the inventive method is to provide economic credits in the form of permitting the use of high sulfur, and therefore lower cost, coal, oil, and natural gas fuels. Otherwise stated, still an additional object of the invention is to provide an efficient technique for sulfur dioxide recovery from flue gases whereby, by reason of such efficiency, higher concentrations of sulfur may be present in the initial fuel. An associated object is to provide economic credits, and overall cost advantages, for hydrothermal plants by permitting the purchase of high sulfur, low cost, fossil fuels.

From the standpoint of chemical processing, another object of the invention is to provide a sulfur dioxide recovery technique which utilizes only common and low-cost chemicals; which features processing of comparatively small quantities of these chemicals; and which utilizes relatively low temperature processing. A related object is to provide a sulfur dioxide recovery technique which does not adversely affect the normal operation of hydrothermal steam generating plants.

Still another object is to provide a method of treating effluent gases containing substantial amounts of fly ash. Heretofore, the presence of fly ash from coal and oil fuels has given rise to significant problems in treating flue gases, chiefly by reason of the abrasiveness of the ash. A feature of the present invention is to provide a method which beneficially utilizes the abrasiveness and other characteristics of fly ash to augment the efficient operation of the recovery system.

Yet a further object of the invention is to provide a versatile method of treating effluent gases, which method is suitable for use with gases of widely differing compositions obtained from a variety of combuston, roasting, and other processes, and which may contain sulfur dioxide in virtually any amount.

Other and more particular objects, features, and advantages of the present invention will become apparent as the description thereof proceeds.

BRIEF DESCRIPTION OF INVENTION

Briefly, in accordance with the invention, there is provided a method of treating effluent gases containing a minor but polluting amount of sulfur dioxide for removal and recovery of the sulfur dioxide. In keeping with the invention, the gas is contacted, at a relatively low temperature and in the substantial absence of sulfur trioxide, with ammonia in the presence of water. The ammonia, either as gaseous ammonia or a aqueous ammonia (ammonium hydroxide), reacts with sulfur dioxide in the effluent gas to form an ammonium sulfite, either $(NH_4)_2SO_3$ or $NH_4HSO_3$ (ammonium bisulfite) or mixtures thereof. The ammonium sulfite is contacted with an aqueous alkaline earth metal oxide (or alternatively with zinc oxide, as will hereinafter appear) to liberate ammonia gas and to form insoluble alkaline earth metal sulfite. Then the ammonia gas is cycled back to the effluent gas contacting step, while the alkaline earth metal sulfite is dried, dehydrated, and thermally decomposed to liberate a concentrated stream of sulfur dioxide for recovery and to form an alkaline earth metal oxide for recycle. Thus the inventive process employs two cyclic processing steps: an ammonia cycle for $SO_2$ removal, and an alkaline earth metal oxide cycle for ammonia regeneration and $SO_2$ concentration.

A notable feature of the present invention, and indeed one which is virtually indispensable to its optimum practice, is the avoidance of oxygen in the processing streams from and after the time when the ammonium sulfite is contacted with the aqueous alkaline earth metal oxide to form an alkaline earth metal sulfite. It has been found that alkaline earth metal sulfites are vulnerable to oxidation in the presence of atmospheric oxygen; the resultant product, an alkaline earth metal sulfite, is difficult to decompose thermally into alkaline earth metal oxide and $SO_3$. Accordingly, as stated above, contact of the ammonium sulfite with aqueous alkaline earth metal oxide, and subsequent drying, dehydrating, and thermally decomposing of the resultant alkaline earth metal sulfite, are conducted in the substantial absence of oxygen.

In further keeping with the invention, alternative procedures are described for efficiently and effectively contacting the effluent gas with the ammonia. Inasmuch as ammonium sulfite formed by reaction between sulfur dioxide and ammonia is a solid and tends to deposit on the walls of contacting vessels, methods are provided for avoiding this deposition. In one method or approach, the effluent gas is maintained at high velocity through the contacting vessel or zone, the velocity being sufficient to maintain the ammonium sulfite as a suspended solid. This approach may be augmented by the presence of substantial amounts of fly ash, which not only acts as an abrasive to remove already-deposited ammonium sulfite, but forms a friable ash-ammonium sulfite deposit when deposition is finally desired. Fly ash augmentation is so beneficial that, in a preferred embodiment of the invention, once-recovered fly ash is recycled to the ammonia-sulfur dioxide contact zone.

In an alternative embodiment, the effluent gas is scrubbed with aqueous ammonia, which forms a solution of ammonium sulfite.

Further, and for optimum versatility with respect to varying conditions and concentrations that may exist in the effluent gas, alternative procedures are described for resolving the mixture of ammonium sulfite and fly ash that is collected either as a moist solid or a slurry. In one embodiment, the mixture is dried and heated to volatilize or sublime the ammonium sulfite; in another, the fly ash is removed by separating the insoluble ash from water-soluble ammonium sulfite.

The invention will be more fully explained and exemplified in the ensuing specification, which is to be read in conjunction with the following drawings, wherein:

DESCRIPTION OF THE DRAWINGS

FIG. 2 is a similar schematic showing one alternative technique of contacting the effluent gas with amomnia, namely the wet scrubbing procedure;

FIG. 3 is another schematic showing a further alternative embodiment for effecting contact between the effluent gas and ammonia; and FIG. 4 is a schematic partial flow sheet of an alternative procedure for resolving the mixture of ammonium sulfite and fly ash.

DETAILED DESCRIPTION

Figure 1:
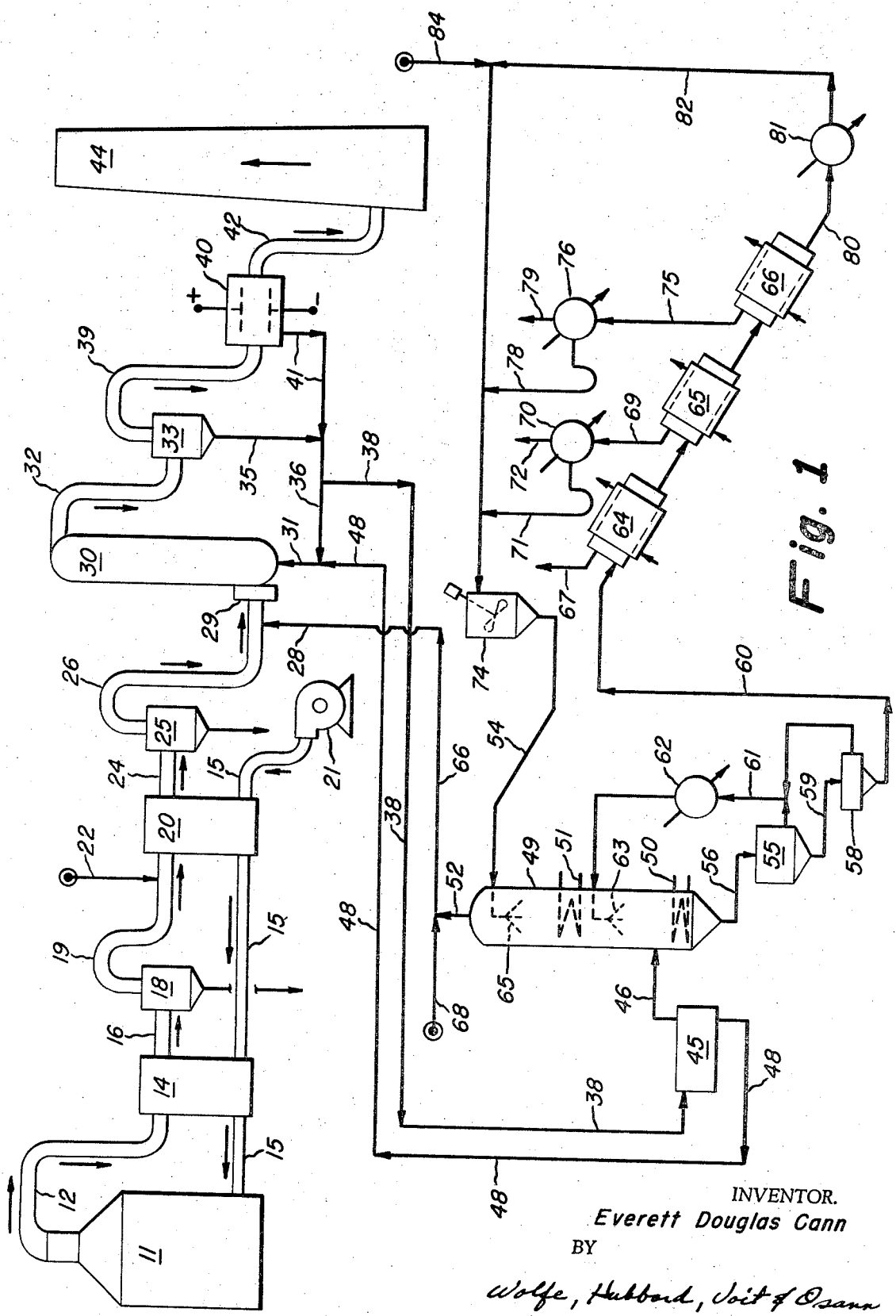
FIG. 1 is a schematic flow sheet, not drawn to scale, exemplifying a preferred embodiment of the inventive method.

Illustrative embodiments of the invention are depicted in FIGS. 1 through 4. It will be appreciated that these are schematic simplified flow sheets, and that various utilities, pumps, gages, etc., have been omitted for reasons of clarity.

Turning first to FIG. 1, a preferred embodiment is therein illustrated for conducting the method of the invention. As shown in the figure, the method is adapted to treat a flue or similar effluent gas from a processing unit such as a coal-fired boiler 11.

The flue or effluent gas from boiler 11 is conducted via conduits 12 to the various downstream processing units, to be described presently. In terms of composition, the flue or effluent gas of conduit 12 will normally contain predominantly nitrogen, carbon dioxide, and carbon monoxide, with some oxygen, water vapor, sulfur dioxide, sulfur trioxide, and traces of other gases. Sulfur dioxide is present in a minor but nonetheless polluting amount, which depending on the sulfur content of the coal and on the percentage of excess air employed in the combustion, may range from as little as 0.05% by volume to as much as, say, 5% or even more. Most commonly, however, the sulfur dioxide content is within the range of about 0.1% to about 1.0%, and indeed this is the range commonly found in boiler plants fired with bituminous coal.

Two other constituents of the flue gas stream are of significance with respect to the present method. Water vapor, from hydrogen combustion and from the presence of water in the combustion air and in the fossil fuels, will be present initially in significant amounts, but when the flue gas is later cooled, as will appear, the concentration will be at the dew point. Also, sulfur trioxide may be present in more or less trace amounts, and for the optimum practice of the invention it is best that no more than, say, about 0.3 volume percent of the flue gas be present when the gas is contacted with ammonia. Fortunately, however, excessive amounts of sulfur trioxide can be tolerated, as the sulfur trioxide readily dissolves in the condensing water vapor when the flue gas is cooled from its initial 1,000–2,000° F. temperature to its comparatively low processing temperature for $SO_2$ removal. The resulting product, sulfuric acid, is thus removed prior to contacting the low temperature effluent gas with ammonia.

Continuing with the discussion of FIG. 1, the effluent gas from boiler 11 is conducting through conduit 12 to a first preheater 14, where the effluent gas exchanges heat with incoming air, which is conducted to the furnace section of boiler 11 via conduit 15. The now somewhat-cooled effluent passes via conduit 16 to a mechanical fly ash remover 18, which removes a substantial amount of the entrained fly ash. The remover 18 may be, for example, a Buell cyclone, a bag filter, or like physical separator.

From remover 18, the effluent gas passes via conduit 19 to a second air preheater 20, where it further exchanges heat with the incoming air supplied via conduit 15 and blower 21. In the second preheater 20 the effluent gas is cooled below the dew point, say below 220° F. preferably to about 150° F. Water and $SO_3$ then condense. As the resultant water-sulfur trioxide condensate, i.e., $H_2SO_4$ is highly acidic, corrosion is prevented by the addition of an aqueous solution or suspension of lime, supplied to the second preheater 20 via conduit 22.

Effluent gases discharged from the second preheater 20 via conduit 24 are conducted to a second mechanical separator 25, operating in a manner similar to that described for separator 18. This separator 25 removes additional fly ash, together with condensate, calcium sulfate, sulfuric acid, and/or calcium hydroxide.

The temperature of the effluent gas stream leaving separator 25 via conduit 26 is now advantageously below about 220° F., preferably below about 200° F., and optimally below about 150° F. For a 500-megawatt hydrothermal plant, the gas is flowing at a rate of about 1.10 million cubic feet per minute at this temperature (150° F.) and at a pressure not substantially different from atmospheric.

Effluent gas in conduit 26 is then in condition for being contacted intimately with ammonia in accordance with the process of the invention. As shown in FIG. 1, ammonia gas is admitted via conduit 28 to the effluent gas conduit 26 just prior to an induction fan 29 leading to a reaction chamber 30, which chamber 30 is a vertically elongated unrestricted chamber through which the constituents pass and are permitted to react to form an ammonium sulfite, according to reaction I or reaction II, below:

$$2NH_3 + SO_2 + H_2O \rightarrow (NH_4)_2SO_3 \quad \text{I}$$
$$NH_3 + SO_2 + H_2O \rightarrow NH_4HSO_3 \quad \text{II}$$

In most instances both reactions occur simultaneously, with the amount of ammonia determining whether $(NH_4)_2SO_3$ or $NH_4HSO_3$ is formed predominantly; an excess of ammonia beyond that necessary to form the bisulfite ($NH_4HSO_3$) tends to favor the sulfite formation. (The term "ammonium sulfite" is thus used herein to indicate either form of the sulfite, unless the contrary appears from the text.)

The amount of ammonia added via conduit 29 is at least sufficient to react with sulfur dioxide in accordance with reaction II, above, but not in excess of the stoichiometric amount for forming $(NH_4)_2SO_3$ in accordance with reaction I, above. Thus, approximately a 100% tolerance is permitted; that is, from one to two mols of ammonia may be introduced per mol of sulfur dioxide without adversely affecting this system. Lower quantities of ammonia merely result in less effective and complete sulfur dioxide removal, while excessive ammonia produces an unreacted ammonia content in the discharged gases which cannot be recovered and so represents wasted reagent. In practice, however, the recycle feature of the inventive process permits substantially all of the ammonia to be recovered and reused, provided the amount of ammonia is not in excess of the stoichiometric amount necessary to form $(NH_4)_2SO_3$ in accordance with reaction I.

As indicated previously, fly ash is present in the effluent gas passing through this system. Most commonly, the concentration of fly ash is within the range of about 1 to about 5 grains per cubic foot at standard conditions, but this may vary considerably depending upon the quality of the coal, the furnace conditions, and the efficiency of separators 18 and 25. Concentrations of from 0.5 to about 20 grains per cubic foot are not unusual.

In keeping with a further aspect of the invention, the concentration of fly ash entering reaction vessel 30 is augmented by the introduction of additional fly ash containing solids via conduit 31. These solids, obtained as will hereinafter be described, contain fly ash and, depending upon selection of processing operations, ammonium sulfite. Most desirably, it has been found that from 50% to 90% recycle of ammonium sulfite is unexpectedly beneficial in maintaining a clean reaction chamber 30, that is, one in which minimal deposition of ammonium sulfite occurs.

At the gas throughput through reaction chamber 30, namely between about 0.2 and about 20 million cubic feet per minute at 150° F., and at a temperature below about 220° F., substantially no ammonium sulfite deposits on the walls of the chamber 30. Instead, the solids are carried through as a mist or suspension.

Gases and dispersed solids from reaction chamber 30 exit via conduit 32 and are passed through a mechanical separator 33. This separator 33, which effects the major separation of ammonium sulfite and fly ash from the effluent gas, may be of any suitable design adapted to remove the ammonium sulfite and fly ash which in the present system exist as a finely dispersed moist solid. The separator 33 advantageously comprises one or more cyclonic separators, e.g., of the Buell type, but various alternative separators are known. Typical of such alternatives include bag filters, baffle systems (as will be later described in conjunction with FIG. 3), and the like. Collected ammonium sulfite solids and fly ash are withdrawn from separator 33 via bottom conduit 35, where they are available for recycle via conduit 36, or for further processing to recover ammonia and sulfur dioxide via conduit 38.

Still following the effluent gas stream, the stream leaves separator 33 via conduit 39 and passes to a conventional electrostatic precipitator, illustratively of the Cottrell type, as shown symbolically by precipitator 40. Here, in a manner well known, finely divided solid particles are given an electrostatic charge and are attracted to oppositely-charged plates, were they collect and are withdrawn via conduit 41 for combining with similar solids at conduit 35. The solids withdrawn via conduit 41 are composed of both ammonium sulfite and fly ash uncollected by separator 33.

After leaving electrostatic precipitator 40, the effluent gas is discharged via conduit 42 to the stack 44, and thence into the atmosphere. By this time the flue gases have been stripped of an estimated 85%–90% of the sulfur dioxide, and are of sufficient purity to be considered pollution-free by contemporary standards.

Returning to the ammonium sulfite-fly ash solid of conduits 35 and 41, these solids are advantageously combined as shown and divided into two portions, one being recycled to the reaction vessel via conduit 36 and the other, an estimated 30% of the total stream, being conducted via conduit 38 to the ammonium sulfite separation facilities now to be described.

To resolve the ammonium sulfite into its constituents of ammonia and sulfur dioxide, the ammonium sulfite is contacted with an aqueous alkaline earth metal oxide (which of course contains a substantial amount of the corresponding alkaline earth metal hydroxide). This liberates the ammonia for recycle and forms an insoluble alkaline earth metal sulfite, which is dried, dehydrated, and thermally decomposed to liberate a concentrated sulfur dioxide stream and to form alkaline earth metal oxide for recycle.

Although any one or more of the alkaline earths may be used in the present invention, either calcium or magnesium is preferred, with magnesium being the material of choice. Alkaline earth metal oxides are uniquely suitable for the inventive process as they form insoluble alkaline earth metal sulfites, which are readily decomposed at moderate temperature into sulfur dioxide and the alkaline earth metal oxide. The convenience of these reactions are dependent on the preservation of a substantially oxygen-free atmosphere, inasmuch as atmospheric oxygen is readily capable of oxidizing an alkaline earth metal sulfite to the corresponding sulfate under conditions prevailing in the recovery system. It should be noted however that ammonium sulfite is relatively resistant to atmospheric oxidation, and accordingly an oxygen-free atmosphere is unnecessary prior to the conversion of ammonium sulfite to the alkaline earth metal sulfite.

The alkaline earth metal sulfite, when formed in aqueous media as in the present invention, crystallize as hydrate salts. Thus, calcium sulfite generally forms the dihydrate, while magnesium sulfite forms the trihydrate when crystallized above about 60° C. and the hexahydrate at lower temperature. The respective sulfites have different dehydration and decomposition temperatures, with calcium sulfite dihydrate losing most of or all of its water at about 100° C. and decomposing into calcium oxide and sulfur dioxide at 500–900° C. Similarly, the magnesium sulfite hydrate loses its water of hydration at approximately 200–300° C., and is decomposed at about 400–700° C. These temperatures may vary widely inasmuch as time is a concurrent variable; in other words, both dehydration and decomposition take place at temperatures lower than those indicated but at correspondingly lower rates, and conversely at higher rates for higher temperatures. Stated otherwise, there is no sharply defined dehydration and decomposition temperature, and optimum temperatures will accordingly depend on equipment sizes and the temperatures available for both reactions.

Returning to the stream entering the recovery section via conduit 38, this stream, as before indicated, is composed of moist ammonium sulfite plus any fly ash that is used in the process. The stream is sent to a sublimation and decomposition chest 45 which is indirectly heated to a temperature of between about 270° F. and about 370° F. Water vapor, volatilized ammonium sulfite, ammonia, and sulfur dioxide pass via conduit 46 as vapors, while the solid or semisolid fly ash resdue is conducted via conduit 48 to conduit 31 for recycle to the reaction chamber 30.

The stream leaving sublimation chest 48 via 46 is then sent to column 49 for reaction with alkaline metal oxide to liberate amomnia and to form insoluble alkaline earth metal sulfite, in accordance with either or both of reactions III and IV, below:

$$(NH_4)_2SO_3 + MO + nH_2O \rightarrow 2NH_3(gas) + MSO_3 \cdot nH_2O \quad III$$

$$NH_4HSO_3 + MO + nH_2O \rightarrow NH_3(gas) + MSO_3 \cdot nH_2O \quad IV$$

The amount of alkaline earth metal oxide, "MO" in the reactions above, is controlled to provide at least the stoichiometric amount necessary to liberate the ammonia and to form the alkaline earth metal sulfite. As implied, the resultant solution will be on the alkaline side, and may have a pH of from about 7.5 to about 11.

To effect the reaction between the alkaline earth metal oxide and the ammonium sulfite, column 49 is advantageously provided with an indirect heating coil 50 near the bottom, a central cooling coil 51 near the top, an ammonia gas discharge conduit 52, and an alkaline earth metal oxide solution entry conduit 54 near the top. The column 49 is additionally provided with gas liquid contact trays or packing both above and below the middle heating coil 51; the upper plates or trays to facilitate scrubbing of the ascending gases by descending alkaline metal oxide solution, while the lower trays to permit intimate contact between the ammonium sulfite (vapors, solid, and solution) and the various liquids in the column 49.

In operation, the column 49 is advantageously provided with a bottom recycle system comprising a clarifier 55 receiving slurry from conduit 56 and the column 49, and a continuous filter or centrifuge 58 receiving slurry from clarifier 55 via conduit 59. Solids in the solution leaving column 49 (the solids, of course, being precipitated alkali metal sulfite) are thus thickened in clarifier 55 and further concentrated in centrifuge 58 before being transmitted via conduit 60 to the drying, dehydrating, and thermal decomposing steps of the process. Liquid from clarifier 55 and centrifuge 58 is conducted via conduit 61 through an optical cooler 62 and thence back to the column 49 where it is distributed via spray head 63 disposed below the middle cooling coil 51.

When ammonium sulfite vapors are admitted into column 49 via conduit 46 from the sublimation and decomposition chest 45, the vapors are contacted initially by the descending stream of liquid from spray head 63, and by a similar stream of liquid derived from spray head 65 and conduit 54. Alkaline earth metal oxides (actually, of course, the hydroxide) in the liquid contact and react with the ammonium sulfite under alkaline conditions to drive off the ammonia gas and to form insoluble alkaline earth metal sulfite. The ammonia gas, amounting to about 183 lbs. per minute, ascends through the column 49 and is discharged via conduit 52, while the solids form a slurry in the liquid descending to the bottom of the column 49 and withdrawn via conduit 56.

The lower heating coil 50 assists in driving off the ammonia, and preferably maintains a temperature within the range of about 80–110° C. at the bottom of the column 49. The central cooling coil 51 serves somewhat as an internal reflux, both returning water vapor to the bottom of the column 49 and cooling the ascending gases. This reflux optimizes further reaction between any sulfur dioxide liberated from the decomposition of the ammonium sulfites and the descending liquid stream of alkaline earth metal oxide solution.

The stream of ammonia gas discharged from the column 49 via conduit 52 is sent via conduit 66 to the ammonia-sulfur dioxide contact chamber 30, together with makeup ammonia admitted via conduit 68. Thus, all or substantially all of the ammonia present as ammonium sulfite in conduit 38 is cycled to the process via conduit 66, with no loss apart from normal mechanical losses and entrainment.

Meanwhile, the stream of wet alkaline earth metal sulfite obtained from clarifier 55 and centrifuge 58 via conduit 60, having some 50% water content, is treated to dry and dehydrate the alkaline earth metal sulfite hydrate to the anhydrous salt. This is thermally decomposed to liberate a concentrated stream of sulfur dioxide and to form alkaline earth metal oxide for recycle. Inasmuch as the alkaline earth metal sulfite is vulnerable to oxidation by atmospheric oxygen, these processing steps likewise are maintained in the substantial absence of oxygen gas, and advantageously in the presence of a reducing gas such as hydrogen and/or carbon monoxide.

To accomplish drying, dehydrating, and thermally decomposing of the alkaline earth metal sulfite, a series of three indirectly heated rotary kilns are advantageously employed, as schematically shown in FIG. 1. These kilns, respectively, kilns 64, 65 and 66, are maintained at progressively higher temperatures to produce the desired conversions.

In kiln 64, steam effects most of the drying at a temperature of about 100–120° C.; the effluent vapors, discharged via conduit 67, are accordingly composed mainly of water vapor, with at best a few percent of sulfur dioxide. It may however be desirable to maintain a somewhat higher temperature in kiln 64, in which event a higher sulfur dioxide content may be expected due to premature decomposition. In this event, the effluent stream of conduit 68 may be treated for sulfur dioxide recovery, suitably by joining this stream with the effluent from the second kiln 65, which normally is discharged via conduit 69 to a condenser 70.

In the second kiln 65 the temperature is maintained at a level higher than that of kiln 64, suitably about 120–300° C. In kiln 65 any residual free water is removed, and a substantial amount of dehydration of the hydrate salt is effected. The reaction is generally represented by reaction V, below:

$$MSO_3 \cdot nH_2O \rightarrow MSO_3 + nH_2O \quad V$$

Condenser 70, which treats the effluent from the second kiln 65, discharges a liquid stream via conduit 71 and a gaseous stream via conduit 72. The former is primarily water, possibly containing some dissolved sulfur dioxide in the event there has been any premature thermal decomposition of the alkaline earth metal sulfite in the kiln 65. In the event there is such decomposition, the stream discharged as a gas from condenser 70 will be sulfur dioxide with water vapor, and in this form is useful for further processing into valuable products, as will be outlined presently. The liquid stream from the condenser 70 is chiefly water, and is recycled as a process liquid stream to the mix tank 74, equipped with an agitator. Water may either be added or removed in order to maintain the water in balance.

In the third kiln 66, a temperature is maintained sufficient to thermally decompose the alkaline earth metal sulfite into sulfur dioxide and alkaline earth metal oxide. This temperature, as discussed earlier, depends on the particular alkaline earth selected and on the desired speed of decomposition. Ordinarily, temperatures within the range of about 400–700° C. are employed for magnesium.

As in the case of the first and second kilns 64, 65, a gaseous product is taken from the third kiln 66. This product, withdrawn via conduit 75, is sent to a condenser 76 where any liquid is transmitted via conduit 78 ultimately to the mixer 74, and where the main product stream of sulfur dioxide is taken as a gas via conduit 79.

In the illustrative 500-megawatt steam plant, the amount of sulfur dioxide is about 250 tons per day, and contains at best only a small amount of water vapor with substantially no other constituents. (If a reducing gas is used in kiln 66, the sulfur dioxide product will contain a portion of the reducing gas.)

As withdrawn via conduit 79, and also conduit 72 if high temperatures are used in the kiln 65, the sulfur dioxide product is suitable for treatment according to conventional techniques in order to recover the sulfur values. For example, the sulfur dioxide may be liquified, or it may be reduced to form elemental sulfur. Alternatively, it may be oxidized in a conventional chamber or contact sulfuric acid plant to produce concentrated sulfuric acid of commerce. A particular advantage of the present invention is that sulfur dioxide is recovered in high purity, and generally requires little or no cleanup.

The solids discharged from the kiln 66 via conduit 80 are composed of alkaline earth metal oxide, typically about 115 lbs. per minute of magnesium oxide. This stream is cooled in exchanger 81, and is conducted via symbolic conduit 82 to the mix tank 74, where it is redissolved in water to form the aqueous alkaline metal oxide (hydroxide) for recycle to the process. Any mechanical or process loss of alkaline metal oxide is replenished with makeup alkaline metal oxide from conduit 84.

As stated initially, other unit processes and operations may be employed as alternatives to the corresponding elements or steps described in connection with the illustrative example herein. For example, and referring now to FIG. 2, instead of utilizing a gaseous ammonia stream to react with the sulfur dioxide in the effluent gas, an aqueous ammonia (ammonium hydroxide) stream may be used. In this event, the reaction vessel 30a is preferably, though not necessarily, operated in down-flow direction, and the stream of aqueous ammonia 28a is admitted near the top of the reaction vessel 30a. Thus, the mechanical separator 33a located in the discharge conduit 32a from the vessel 30a removes an aqueous solution or suspension of ammonium sulfite, which is transmitted via conduit 35a to a recovery system similar to that shown in FIG. 1. (It will be apparent that the numbers of FIG. 2 correspond with those of FIG. 1, except that the suffix "a" is used in FIG. 2 to denote the necessary modification of processing equipment when aqueous ammonia is used.)

In other respects, the system of FIG. 2 is similar to that described for FIG. 1, except of course that the ammonia effluent of conduit 52 in FIG. 1 is gaseous, and must be mixed with water before it is suitable for admission into the system of FIG. 2 via conduit 28a.

Similarly, the modification of FIG. 3 may be employed in addition to the system of FIG. 1. According to FIG. 3, effluent gases leaving contact chamber 30b, corresponding to chamber 30 of FIG. 1, are transmitted via a baffled chamber 85 (in lieu of the mechanical separator 33 of FIG. 1). The chamber 85 is provided with a plurality of impingement baffles and/or bag filters to collect the ammonium sulfite formed in reaction chamber 30b. Periodically, when the baffles or filters become fouled, they are cleaned by washing with water admitted via one or more conduits 86 and withdrawn via conduit 88; the resultant solution may then be admitted via conduit 46 (of FIG. 1) for reaction with alkaline metal oxide to liberate the ammonia and produce the alkaline metal sulfite precipitate.

The system of FIG. 4 is an alternative to sublimation and decomposition for separating ammonium sulfite from fly ash, as carried out in sublimation chest 45 of FIG. 1. According to the system of FIG. 4, the mixture of ammonium sulfite and fly ash (obtained via conduit 38 of FIG. 1) is transmitted via conduit 38a to a mixer-dissolver 89, where a stream of process water 90 is admitted to selectively dissolve the ammonium sulfite. The resultant slurry of ammonium sulfite solution and fly ash is conducted to a filter or centrifugal separator 91, where the fly ash is withdrawn as a solids via conduit 48a (corresponding to conduit 48 of FIG. 1) and where the amonium sulfite solution is withdrawn via conduit 46a (corresponding to conduit 46 of FIG. 1).

Most of the discussion above has been confined to the use of alkaline earth metal oxides for the sulfur dioxide recovery cycle. Under certain circumstances, this may be replaced by zinc oxide, which affords advantages compensating at least in part for its reduced basicity compared to alkaline earth metal oxides.

Zinc oxide forms a decomposable sulfite with $SO_2$ or ammonium sulfite in the manner of alkaline earth metal oxides. The sulfite however is somewhat more resistant to atmospheric oxidation, and this is of notable value when, for various reasons, it is difficult to maintain a substantially oxygen free gas—e.g., below about 0.3%—in the sulfur dioxide cycle. Furthermore, zinc sulfites are decomposed at lower temperatures than are the corresponding alkaline earth metal sulfites.

Due to its lower basicity, larger quantities of zinc oxide are required, but concurrently certain advantages accrue to the process. Thus, the relative molar amount of zinc oxide admitted to column 49 via conduit 54 is greater, e.g., by about 10–80%, than that stoichiometrically required by reactions III and IV, above. With such an excess, ammonia is evolved readily from the reaction mixture.

As a concurrent benefit from the use of additional metal oxide when zinc oxide is employed, substantially less water need be present in the bottom portion of column 49; indeed, it is possible to have as much as 50% solids in the stream leaving column 49 via line 46. With such a high concentration of zinc sulfite, the thickener 55 and the centrifuge 58 may be omitted from the system, and the stream sent directly to the kilns 64, 65, 66. Consequently, a thickener 55 and a centrifuge 58 need not be employed when using zinc oxide. In all other respects, zinc oxide functions in the manner discussed earlier for alkaline earth metal oxides.

Other modifications of the systems described earlier will suggest themselves in light of the foregoing description. For example, the chamber 30a of FIG. 2 is shown as a cocurrent contractor and scrubber, but a countercurrent system may be employed equally well particularly when the gas velocity is below about 5–10 linear feet per second through the chamber 30a. The chamber may be equipped with contact trays, plates, grids, or packing, and may have an intermediate draw-off tray and internal reflux system whereby the ammonium sulfite slurry is withdrawn, thickened, and the supernatent liquor (after optional enrichment with additional ammonia) returned to the chamber.

Thus, there has been provided, in accordance with the invention, an outstandingly advantageous technique for simultaneously purifying a sulfur dioxide contaminated effluent gas and for recovering the valuable sulfur dioxide as a concentrated useful stream. While the invention has been described in conjunction with specific embodiments thereof, it is apparent that various alternatives, modifications, and variations of the description will be apparent to those skilled in the art in light of the foregoing description. Accordingly, it is intended to embrace all such alternatives, modifications, and variations as fall within the spirit and scope of the appended claims.

I claim as my invention:

1. A method of treating an effluent gas containing a minor but polluting amount of sulfur dioxide and substantially no sulfur trioxide, and of recovering said sulfur dioxide as a concentrated useful stream, said gas having a temperature below about 220° F. which method comprises:
   (1) intimately contacting said effluent gas with ammonia in the presence of water, the amount of ammonia being sufficient to react with said sulfur dioxide to form an ammonium sulfite but not in excess of the stoichiometric amount for forming $(NH_4)_2SO_3$, (2) separating said ammonium sulfite from the effluent gas.

(3) contacting said ammonium sulfite in the substantial absence of oxygen with at least the stoichiometric amount of an aqueous member of the group consisting of alkaline earth metal oxide and zinc oxide to liberate ammonia and to form insoluble alkaline earth metal or zinc sulfite, (4) cycling said liberated ammonia to step (1), (5) drying, dehydrating, and thermally decomposing said insoluble sulfite in the substantial absence of oxygen to liberate a concentrated stream of sulfur dioxide and to regenerate said member of the group consisting of alkaline earth metal oxide and zinc oxide, (6) recovering said concentrated stream of sulfur dioxide, and (7) cycling said member of the group consisting of alkaline earth metal oxide and zinc oxide to step (3).

2. Method of claim 1 wherein said effluent gas is at a temperature below about 200° F.

3. Method of claim 1 wherein said ammonia of step (1) is ammonia gas.

4. Method of claim 1 wherein said ammonia of step (1) is aqueous ammonia.

5. Method of claim 1 wherein said effluent gas contains fly ash, and said method includes the steps of separating a mixture of fly ash and ammonium sulfite from the effluent gas, separating said fly ash from said ammonium sulfite, and conducting said separated ammonium sulfite to step (3).

6. Method of claim 5 including the step of cycling said fly ash to step (1).

7. Method of claim 5 wherein said separation of fly ash from ammonium sulfite is by sublimation.

8. Method of claim 5 wherein said separation of fly ash from ammonium sulfite is by water extraction.

9. Method of claim 1 wherein said member is calcium oxide.

10. Method of claim 1 wherein said member is magnesium oxide.

11. Method of claim 1 wherein said member is zinc oxide.

References Cited

UNITED STATES PATENTS

| | | | |
|---|---|---|---|
| 1,931,408 | 10/1933 | Hodsman et al. | 23—178S |
| 2,082,006 | 6/1937 | Johnstone | 23—178S |
| 2,161,056 | 6/1939 | Johnstone et al. | 23—178S |
| 2,862,789 | 12/1958 | Burgess | 23—178 |
| 2,922,735 | 1/1960 | Johnstone | 23—178 |
| 2,825,628 | 3/1958 | Johannsen et al. | 23—177 |

OTHER REFERENCES

Perry: Chem. Engr. Handbook, 4th ed. (McGraw-Hill 1963), section 17, p. 24.

OSCAR R. VERTIZ, Primary Examiner

C. B. RODMAN, Assistant Examiner